Patented July 27, 1943

2,325,259

UNITED STATES PATENT OFFICE 2,325,259

VULCANIZATION ACCELERATOR

Roger A. Mathes, Akron, and Paul C. Jones, Silver Lake, Ohio, assignors to The B. F. Goodrich Company, New York, N. Y., a corporation of New York No Drawing. Application December 24, 1940, Serial No. 371,578

6 Claims. (Cl. 260—785)

This invention relates to the vulcanization of rubber and pertains specifically to the acceleration of vulcanization by the disulfides formed by reacting a metallic salt of the 2-mercapto thiazolines with the nitro phenyl sulfur halides.

It is well known that the vulcanization of rubber may be accelerated by the presence of various compounds, notably sulfur-containing compounds, in the rubber composition. It has also been reported in the literature that the 2-mercapto thiazolines, although similar in structure to the 2-mercapto thiazoles, which are excellent accelerators, are nevertheless weak accelerators themselves. However, in a co-pending application Serial No. 255,358, filed February 8, 1939, we have disclosed that 2-mercapto thiazolines in combination with monocarboxylic acids are good accelerators. We have now discovered that the thiazolinyl nitro-aryl disulfides, in conjunction with monocarboxylic acids, saturated or unsaturated, or their metallic salts, when used as accelerators in rubber compositions give stocks with good elongation and tensile strength characteristics.

The thiazolines which may be used for the synthesis of our new accelerators may be substituted in a variety of ways, comprising such compounds as 2-mercapto thiazoline, 2-mercapto 4-methyl thiazoline, 2-mercapto 4,5-dimethyl thiazoline, 2-mercapto 4-ethyl thiazoline, 2-mercapto 5-ethyl thiazoline, 2-mercapto 4,5-diethyl thiazoline, 2-mercapto 4-phenyl thiazoline, 2-mercapto 4-methoxy thiazoline, 2-mercapto 4,5-tetramethylene thiazoline, and the like. We prefer to use an alkali metal salt of such a mercaptan in the synthesis of our new compounds. The other compound used in the synthesis, a nitro aryl sulfur halide, may also contain various substituent groups. Such compounds as p-nitro phenyl sulfur chloride, o-nitro phenyl sulfur chloride, 2-benzoyl 4-nitro phenyl sulfur chloride, etc., or the corresponding bromides are satisfactory.

The best results are obtained with this type of accelerator, we have found, when it is used in conjunction with a saturated or unsaturated monocarboxylic acid, such as caprylic, lauric, oleic, stearic, linoleic, palmitic, benzoic, salicylic, and the like. Mere traces of such acids are effective activators for our accelerator, but we prefer to use from 1% to 5% or more in the rubber composition. The tin, lead, zinc, calcium, sodium, or other alkali, alkaline earth, or heavy metal salts of the above acids may be used as the activator in about the same amount.

As a specific example of our invention we have prepared 2-thiazolinyl o-nitrophenyl disulfide as shown in the following reaction:

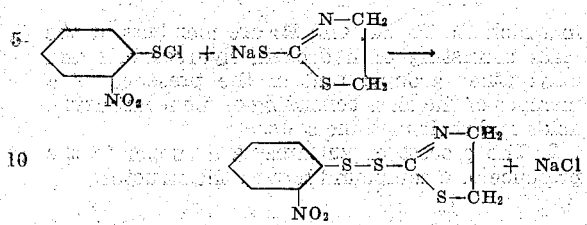

A solution of 14.7 g. of o-nitrophenyl sulfur chloride in 100 ml. of methanol was added slowly with stirring to a solution of 9.25 g. of 2-mercapto thiazoline and 3.4 g. of sodium hydroxide in 100 ml. of water at room temperature. The product, in the form of fine crystals, was filtered from the reaction mixture and washed with water. A 70% yield of a material melting at 140° to 145° C. was obtained.

Using this product as an accelerator, the following composition was prepared:

| | |
|---|---|
| Rubber | 100 |
| Zinc oxide | 5 |
| Sulfur | 3 |
| Lauric acid | 3 |
| 2-thiazolinyl o-nitrophenyl disulfide | 1 |

When cured in a mold at 287° F. for the indicated length of time the stock produced had the following properties, where T is tensile strength in pounds per square inch and E is elongation in per cent:

| Time of cure, min. | T | E |
|---|---|---|
| 15 | 1,920 | 1,025 |
| 30 | 3,240 | 870 |
| 60 | 3,400 | 820 |

These results show the activity of our new type of accelerators.

Our new accelerators are effective not only with natural rubber or caoutchouc, but also with balata, gutta percha, latex, rubber isomers, or any synthetic rubber which can be vulcanized, that is, which loses its property of thermoplasticity and becomes elastic when heated in the presence of sulfur and the term "a rubber" is used in the claims to designate all of the above-mentioned materials. Other materials, such as pigments, fillers, reinforcing agents, softeners, antioxidants, other accelerators, etc., may be used in the composition.

The rubber stocks produced with our accelerators are not limited in their uses, being applicable to the manufacture of pneumatic and solid rubber tires, hose, belting, footwear, surgical goods, latex-dipped goods, all manner of molded articles, and the like.

Any of the usual methods of vulcanization, such as heating in a mold, in hot air, steam, hot water, etc. are suitable.

Although we have herein disclosed specific embodiments of our invention, we do not intend to limit ourselves solely thereto but only to the spirit and scope of the appended claims.

We claim:

1. The process of vulcanizing a rubber in the presence of a compound having the structure

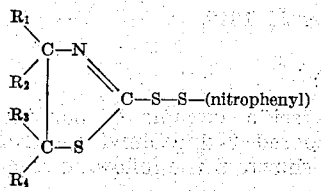

in which $R_1$, $R_2$, $R_3$, and $R_4$ are members of the class consisting of hydrogen, hydrocarbon and alkyl ether groups; and in the presence of a member of the class consisting of monocarboxylic acids and their metallic salts.

2. The process of vulcanizing a rubber in the presence of a compound having the structure

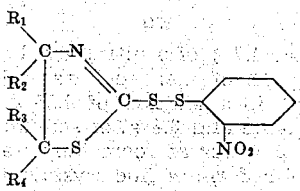

in which $R_1$, $R_2$, $R_3$, and $R_4$ are members of the class consisting of hydrogen, hydrocarbon, and alkyl ether groups; and in the presence of a member of the class consisting of monocarboxylic acids and their metallic salts.

3. The process of vulcanizing a rubber in the presence of 2-thiazolinyl o-nitrophenyl disulfide and a member of the class consisting of monocarboxylic acids and their metallic salts.

4. A composition comprising a rubber vulcanized in the presence of a compound having the structure

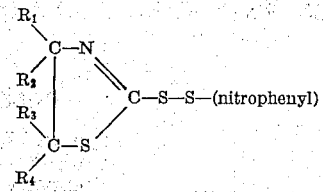

in which $R_1$, $R_2$, $R_3$, and $R_4$ are members of the class consisting of hydrogen, hydrocarbon, and alkyl ether groups; and in the presence of a member of the class consisting of monocarboxylic acids and their metallic salts.

5. A composition comprising a rubber vulcanized in the presence of a compound having the structure

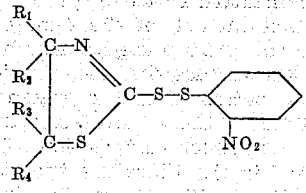

in which $R_1$, $R_2$, $R_3$, and $R_4$ are members of the class consisting of hydrogen, hydrocarbon, and alkyl ether groups; and in the presence of a member of the class consisting of monocarboxylic acids and their metallic salts.

6. A composition comprising a rubber vulcanized in the presence of 2-thiazolinyl o-nitrophenyl disulfide and a member of the class consisting of monocarboxylic acids and their metallic salts.

ROGER A. MATHES.
PAUL C. JONES.